United States Patent [19]

Shimizu et al.

[11] Patent Number: 4,914,609

[45] Date of Patent: Apr. 3, 1990

[54] DISPLACEMENT MEASURING APPARATUS

[75] Inventors: Giichiro Shimizu; Toshiharu Okuyama; Yoshio Wakatsuki, all of Tokyo, Japan

[73] Assignee: Man Design Co., Ltd., Tokyo, Japan

[21] Appl. No.: 223,356

[22] Filed: Jul. 25, 1988

[30] Foreign Application Priority Data

Jul. 30, 1987 [JP] Japan ................................ 62-117097

[51] Int. Cl.⁴ ........................ G06F 15/36; G05B 19/28
[52] U.S. Cl. ...................................... 364/561; 33/504; 33/505; 73/1 J; 377/17
[58] Field of Search ........... 364/560, 561, 570, 571.01, 364/571.06; 33/503–505; 73/1 J; 377/17

[56] References Cited

U.S. PATENT DOCUMENTS

| 4,550,418 | 10/1985 | Deis | 364/561 |
|---|---|---|---|
| 4,587,622 | 5/1986 | Herzog | 364/561 |
| 4,588,989 | 5/1986 | Yasuda et al. | 340/663 |
| 4,602,196 | 7/1986 | Matsui | 364/561 |
| 4,608,657 | 8/1986 | Manome et al. | 364/571.01 |
| 4,736,313 | 4/1988 | Nishimura et al. | 364/561 |

FOREIGN PATENT DOCUMENTS 3405844 8/1984 Fed. Rep. of Germany.
3410292 9/1985 Fed. Rep. of Germany.

Primary Examiner—Gary Chin
Assistant Examiner—Brian M. Mattson
Attorney, Agent, or Firm—Nixon & Vanderhye

[57] ABSTRACT

An oscillator outputs an oscillator frequency corresponding to a moving distance of a probe. A counter counts the oscillator frequency of the oscillator. A computer calculates the moving distance. A display unit displays the moving distance computed by the computer. A voltage booster and a voltage stabilizing circuit are connected between the oscillator and a battery. The driving voltage from the battery is supplied to the oscillator through the voltage booster and the voltage stabilizing circuit, and is supplied to the counter, computer and the display unit without passing through the voltage booster and the voltage stabilizing circuit in order to reduce the power dissipation.

1 Claim, 4 Drawing Sheets

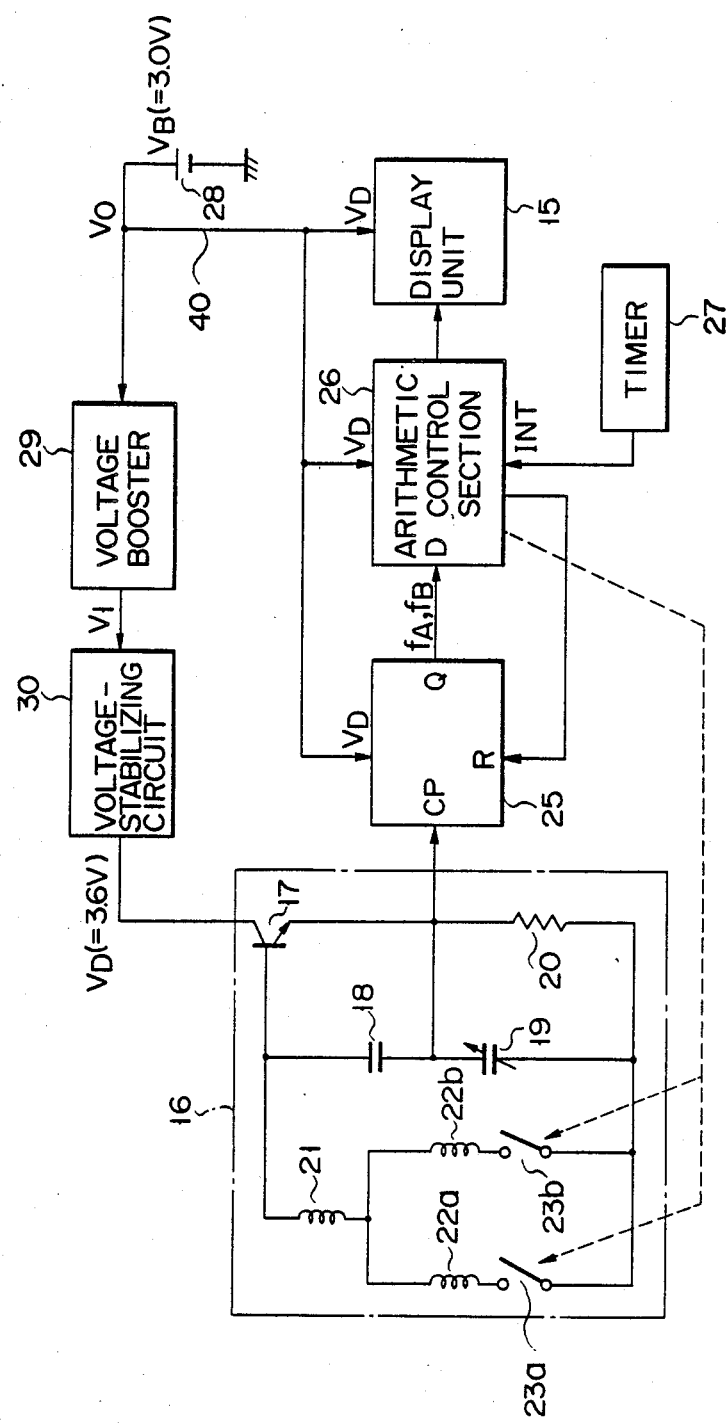
F I G. 3

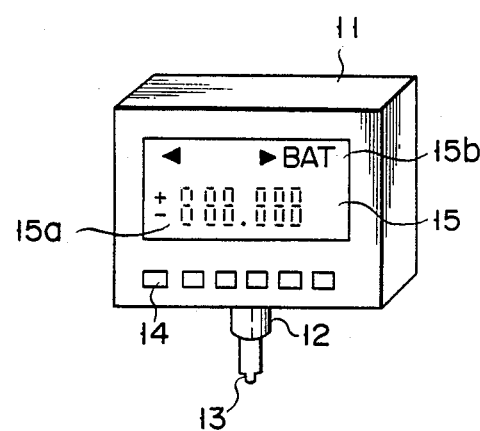
F I G. 4
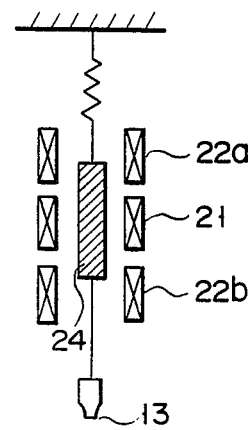
F I G. 5

DISPLACEMENT MEASURING APPARATUS

BACKGROUND OF THE INVENTION

1. Field of the Invention

The present invention relates to a displacement measuring apparatus for calculating a moving amount of a probe brought into contact with an object to be measured in accordance with a change in oscillation frequency of an oscillator and, more particularly, to a displacement measuring apparatus wherein the service life of a battery for supplying a drive voltage to electronic components of the apparatus can be prolonged.

2. Description of the Related Art

A dial gauge shown in FIG. 1 is known as a portable displacement measuring apparatus for accurately measuring a very short distance of an object to be measured in units of 0.1 mm or 0.01 mm. Displacement measuring apparatus 1 represented by a dial gauge, is available to digitally display a moving amount from a reference position of a probe 2 on a display unit 3. A means for converting a moving amount of probe 2 into an electrical signal is exemplified by an oscillator built-in arrangement for detecting a change in oscillation frequency. More specifically, a core member is mounted on a shaft for supporting probe 2, and a pair of coils are wound around the core member. These coils are used to constitute a Colpitts oscillator. A moving distance of the core member, i.e. a moving distance of probe 2, is digitally calculated in accordance with a change in oscillation frequency f of the oscillator when the core member interlocked with probe 2 is moved in the pair of coils. A calculation result is digitally displayed on display unit 3.

FIG. 2 is a block diagram showing electronic components built into displacement measuring apparatus 1. Frequency f of a Colpitts oscillator 4 having coils which receives the core member connected to probe 2 is counted by counter 5. Oscillation frequency f counted by counter 5 is input to arithmetic control unit 6 comprising a microcomputer or the like. Arithmetic control unit 6 calculates a moving amount of probe 2 in accordance with a change in frequency f input thereto. The calculated moving amount is digitally displayed on display unit 3.

Battery 7 is stored in a casing of displacement measuring apparatus 1 to apply drive voltage $V_D$ to electronic components 4, 5, 6, and 3. For example, if an initial voltage of battery 7 is set to be about 3.3 V (rated voltage $V_B$=3.0 V), output voltage $V_O$ of battery 7 is boosted by voltage booster 8 to a voltage of, e.g. 4 to 6 V. The boosted voltage is decreased to drive voltage $V_D$ of, e.g. about 3.6 V by voltage stabilizing circuit 9. Drive voltage $V_D$ is always controlled to be a predetermined voltage by voltage stabilizing circuit 9 and is supplied to oscillator 4, counter 5, arithmetic control unit 6, and display unit 3.

Voltage booster 8 and voltage stabilizing circuit 9 are used in the above arrangement due to the following reason. Output voltage $V_O$ of battery 7 exhibits initial voltage of 3.3 V when battery 7 is replaced with a new one. However, when displacement measuring apparatus 1 is used for a long period of time, power consumption of the respective electronic components causes a decrease in output voltage $V_O$. In order to maintain high measurement precision in the displacement measuring apparatus, high stability of oscillation frequency f of oscillator 4 is required. Therefore, high stability of drive voltage $V_D$ applied to oscillator 4 is also required.

If rated voltage $V_B$ of battery 7 has a value sufficiently larger than that of drive voltage $V_D$ of the electronic components, voltage booster 8 need not be used.

When battery 7 is mounted in a battery holder without arranging a power switch so as to reduce manufacturing cost, drive voltage $V_D$ is immediately applied to electronic components 4, 5, 6, and 3.

The following problem occurs in the displacement measuring apparatus for applying drive voltage $V_D$ to the respective electronic components after output voltage $V_O$ of battery 7 is stabilized to the predetermined voltage such as 3.6 V by voltage booster 8 and voltage stabilizing circuit 9. Voltage stabilizing circuit 9 must be used to decrease the DC voltage so as to obtain stable drive voltage $V_D$. Power consumption of voltage stable circuit 9 is equivalent to a total current value of current values of drive voltage $V_D$ applied to the electronic components. If the number of electronic components which receive drive voltage $V_D$ from voltage stable circuit 9 is increased, power consumption of voltage stable circuit 9 is also increased. As a result, the service life of battery 7 is undesirably shortened.

In particular, in the displacement measuring apparatus (FIG. 2) wherein output voltage $V_O$ from battery 7 is boosted by voltage booster 8 and then decreased to the predetermined voltage by voltage stabilizing circuit 9, power consumption of voltage booster 8 is large, and therefore, the service life of the battery is further shortened.

SUMMARY OF THE INVENTION

It is an object of the present invention to provide a displacement measuring apparatus wherein a drive voltage is applied to only an oscillator through a voltage stabilizing circuit to minimize power consumption of the voltage stabilizing circuit so that the service life of the battery can be greatly prolonged while high measurement precision is assured.

In order to achieve the above object of the present invention, there is provided a displacement measuring apparatus comprising:

probe means brought into contact with an object to be measured;

oscillating means including a core member coupled to the probe means and a coil wound around the core member, the oscillating means outputting an oscillation frequency corresponding to a moving distance of the probe means when the core member is moved in the coil in response to movement of the probe means;

counting means for counting the oscillation frequency of the oscillating means and outputting a count signal representing the oscillation frequency;

arithmetic control means for calculating the moving distance of the probe means on the basis of a count from the counting means;

display means for displaying the moving distance calculated by the arithmetic control means;

battery means for supplying a drive voltage to the oscillating means, the counting means, the arithmetic control means, and the display means;

voltage stabilizing means, connected between the battery means and the oscillating means, for stabilizing the drive voltage from the battery means and applying a predetermined stable voltage to the oscillating means; and means for directly applying the drive voltage from the battery means to the counting means, the arithmetic control means, and the display means.

In the displacement measuring apparatus having an arrangement described above, the output voltage from the battery is applied as a drive voltage to the counter, the arithmetic control unit, the display unit, and the like. The output voltage from the battery is always stabilized by the voltage stable circuit into a predetermined voltage, and this predetermined voltage is applied to the oscillator.

In general, when the drive voltage applied to the electronic components as analog circuit elements, such as an oscillator, varies, output characteristics also vary. However, the electronic components of digital circuit elements for performing digital signal processing, such as the counter, the arithmetic control unit, and the display unit, are not subjected to variations in digital output characteristics if the drive voltage does not fall outside a predetermined range. Therefore, even if the drive voltage is directly applied from the battery, the output characteristics of the electronic components, excluding the oscillator, are not degraded. As a result, power consumption of the voltage stable circuit can be reduced.

BRIEF DESCRIPTION OF THE DRAWINGS

Other objects and features of the present invention will be apparent from the following description taken in conjunction with the following figures, in which:

FIG. 3 is a block diagram showing an arrangement according to an embodiment of the present invention;

FIG. 4 is a perspective view showing an outer appearance of the displacement measuring apparatus shown in FIG. 3;

FIG. 5 is a view showing a positional relationship between a core member and coils in an oscillator shown in FIG. 3;

DETAILED DESCRIPTION OF THE PREFERRED EMBODIMENT

Figure 1:
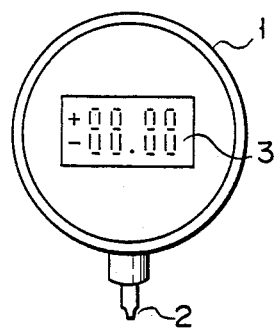
FIG. 1 is a view showing an outer appearance of a conventional displacement measuring apparatus.
Figure 2:
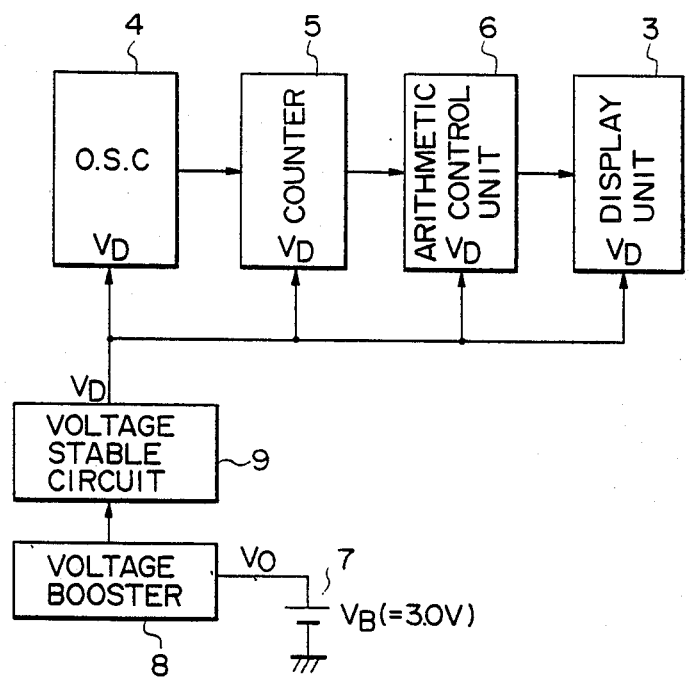
FIG. 2 is a block diagram showing an arrangement of the conventional displacement measuring apparatus.

An embodiment of the present invention will be described in detail with reference to the accompanying drawings.

FIG. 4 is a perspective view showing an outer appearance of a displacement measuring apparatus of this embodiment. Probe 13 extends through guide shaft 12 from the lower surface of casing 11 having a substantially rectangular parallelepiped shape and is vertically movable with respect to casing 11. Function keys 14 for mode selection, zero point adjustment, and the like, and display unit 15 of liquid crystal display elements are mounted on the front surface of casing 11.

Display unit 15 includes numerical display section 15a for displaying a measured moving distance of probe 13 by 6 digits and mark display section 15b for displaying mark "◄" representing that the moving distance is below the effective range, mark "►" representing that the moving distance exceeds the effective range, and the BAT mark representing that the battery voltage is below an allowable voltage range.

FIG. 3 is a schematic block diagram of the displacement measuring apparatus. Reference numeral 16 denotes a Colpitts oscillator having a known arrangement. Capacitors 18 and 19 and resistor 20 are connected to the base-emitter path of transistor 17. One end of primary coil 21 is connected to the base of transistor 17. A circuit composed of secondary coil 22a and switch 23a and a circuit composed of secondary coil 22b and switch 23b are connected in series with each other between the other end of primary coil 21 and resistor 20. Secondary coils 22a and 22b have identical impedances. Primary coil 21 and secondary coils 22a and 22b are arranged such that two secondary coils 22a and 22b vertically sandwich primary coil 21, as shown in FIG. 5. Core member 24 mounted on the shaft of probe 13 is inserted via coils 21, 22a, and 22b. The shaft of probe 13 is fixed to the ceiling of casing 11 via a spring. When probe 13 is moved upward, core member 24 is caused to move toward secondary coil 22a so that the coupling density between primary coil 21 and secondary coil 22a is thereby increased. However, when probe 13 is moved downward, core member 24 is caused to move toward secondary coil 22b so that the coupling density between primary coil 21 and secondary coil 22b is thereby increased.

Figure 6:
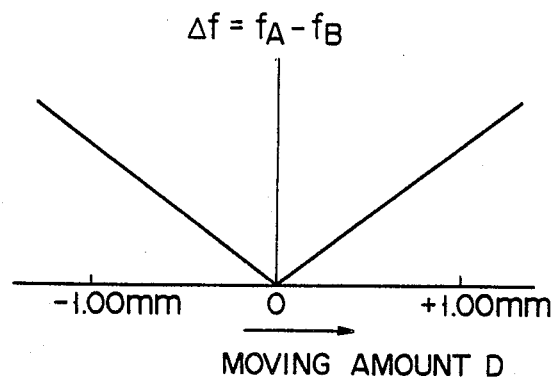
FIG. 6 is a graph showing a relationship between a moving amount of a probe and a frequency difference of the oscillator in the embodiment of FIG. 3.

When core member 24 is located at the central position (reference position) of primary coil 21, oscillation frequency $f_A$ of the Colpitts oscillator 16 upon closing of only switch 23a coincides with oscillation frequency $f_B$ upon closing of only switch 23b. However, when core member 24 deviates from the reference position, oscillation frequencies $f_A$ and $f_B$ differ from each other. This frequency difference $\Delta f (= f_A - f_B)$ corresponds to moving distance D from the reference position of core member 24. The characteristic between frequency difference $\Delta f$ and moving distance D is almost linear, as shown in FIG. 6.

Oscillation frequencies $f_A$ and $f_B$ of oscillator 16 are extracted from the emitter terminal of transistor 17 connected to an intermediate point between capacitors 18 and 19 and are counted by counter 25. The counted oscillation frequencies from counter 25 are converted into digital values $f_A$ and $f_B$ which are then input to arithmetic control section 26. Arithmetic control section 26 comprises, e.g., a microcomputer and includes various I/O ports, a ROM, a RAM, and the like. Arithmetic control section 26 alternately opens/closes switches 23a and 23b in oscillator 16 in accordance with a time interrupt signal input from timer 27 every predetermined interval. Arithmetic control section 26 calculates frequency difference $\Delta f (= f_A - f_B)$ from oscillation frequencies $f_A$ and $f_B$ input from counter 25 and calculates moving distance D from the reference position of probe 13 by using equation $D = F(\Delta f)$ representing the characteristics (FIG. 6) stored in a memory. The calculated distance is displayed on display unit 15.

Battery 28 having an initial voltage (rated voltage $V_B = 3.0$ V) of, e.g., about 3.3 V, voltage booster 30 for doubling output voltage $V_O$ from battery 28, and voltage stable circuit 30 for converting output voltage $V_1$ from voltage booster 29 into a predetermined voltage of, e.g., 3.6 V are incorporated in casing 11. The predetermined voltage of 3.6 V output from voltage stable circuit 30 is applied as drive voltage $V_D$ to the collector terminal of transistor 17 in oscillator 16.

Output voltage $V_O$ from battery 28 is directly applied as drive voltage $V_D$ to power terminals of counter 25, arithmetic control section 26, and display unit 15.

Figure 7:
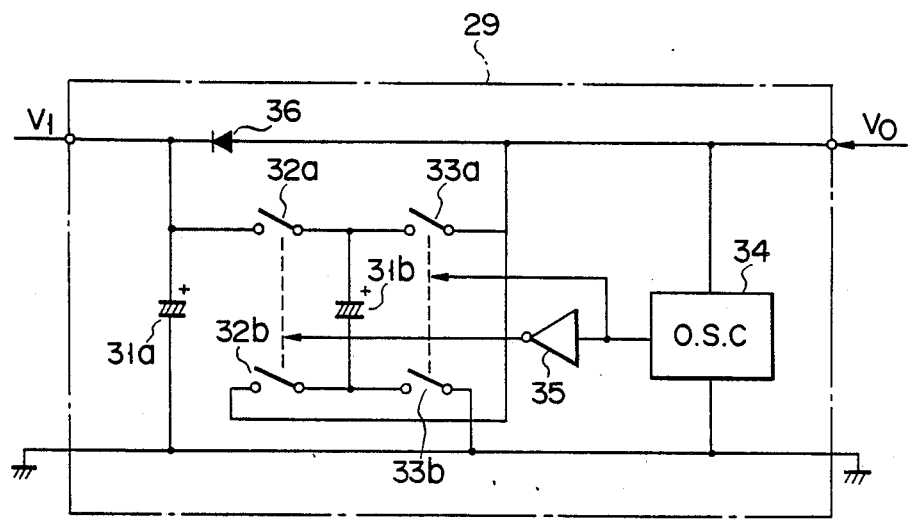
FIG. 7 is a circuit diagram showing a detailed arrangement of a voltage booster shown in FIG. 3.

Various circuits have been developed as voltage booster 29 for boosting a DC voltage. In this embodiment, a capacitor pump type circuit arrangement shown in FIG. 7 is employed since it has low power consumption. Voltage booster 29 comprises a pair of capacitors 31a and 31b, interlocked contact pairs 32a and 32b and 33a and 33b for switching connecting states of capacitors 31a and 31b, oscillator 34, inverter 35, and diode 36. Oscillator 34, inverter 35, and diode 36 are operated to output a signal for switching interlocked contacts 32a through 33b at a predetermined frequency.

In voltage booster 29 having the above arrangement, capacitor 31a is always charged with output voltage $V_O$ from battery 28 through diode 36. During the positive half cycle of the AC signal output from oscillator 34, contacts 33a and 33b are closed while contacts 32a and 32b are open. Capacitor 31b is charged with output voltage $V_O$ from battery 28 through contacts 33a and 33b. During the negative half cycle of the AC signal from oscillator 34, contacts 33a and 33b are open, and contacts 32a and 32b are closed. At this time, the positive potential of battery 28 is applied to the ground terminal of capacitor 31b so that charge of capacitor 31b flows in capacitor 31a. A terminal voltage of capacitor 31a, i.e. output voltage $V_I$ from voltage booster 29, is twice output voltage $V_O$ of battery 28.

In the displacement measuring apparatus having the arrangement described above, when new battery 28 is mounted in the battery holder, output voltage $V_O$ of battery 28 is set to be the initial voltage of about 3.3 V. Arithmetic control section 26 including counter 25 and a microcomputer and display unit 15 of liquid crystal display elements receive drive voltage $V_D$ of 3.3 V. Output voltage $V_O$ of battery 28 is almost doubled by voltage booster 29, and the resultant voltage is input to voltage stabilizing circuit 30. The voltage is decreased by voltage stabilizing circuit 30 to a predetermined voltage of 3.6 V. The predetermined voltage as drive voltage $V_D$ is applied to oscillator 16. Since the allowable voltage range of drive voltage $V_D$ for counter 25, arithmetic control section 26, and display unit 15 is about 4.0 to 2.8 V, oscillator 16, counter 25, arithmetic control section 26, and display unit 15 are normally operated.

When a predetermined period of time has elapsed upon mounting of battery 28 in the battery holder and output voltage $V_O$ of battery 28 is decreased to, e.g. about 3.0 V, drive voltage $V_D$ for counter 25, arithmetic control section 26, and display unit 15 is also decreased to about 3.0 V. Such voltage drop allows normal operations of electronic components 25, 26, and 15 as digital circuit elements without failure, as described above.

Unless output voltage $V_I$ of voltage booster 29 is decreased to 3.6 V or less, i.e. unless output voltage $V_O$ of battery 28 is decreased to 1.8 V or less, the drive voltage $V_D$ which is applied to the oscillator 16 can be maintained to be the predetermined voltage of 3.6 V due to the function of voltage stabilizing circuit 30.

When output voltage $V_O$ of battery 28 is decreased to 2.8 V (critical voltage) or less and counter 25, arithmetic control section 26, display unit 15 and the like frequently fail, the BAT mark LED in display unit 15 is turned on.

In the displacement measuring apparatus having the arrangement described above, voltage booster 29 and voltage stabilizing circuit 30 are inserted in a voltage path for oscillator 16 whose drive voltage $V_D$ must be always maintained at the predetermined voltage (3.6 V) with accuracy. No voltage control means need be inserted in a voltage path for electronic components (e.g. counter 25, arithmetic control section 26, and display unit 15) which do not require accurate control of drive voltage $V_D$ to be the predetermined voltage. Therefore, an output current value of voltage stabilizing circuit 30 can be greatly decreased as compared with an output current value in the conventional displacement measuring apparatus shown in FIG. 1. For example, the output current value for only oscillator 16 is about 200 μA. Therefore, power consumption of voltage stabilizing circuit 30 can be minimized, and the service life of battery 28 can be greatly prolonged.

The present invention is not limited to the particular embodiment described above. If initial voltage $V_B$ of battery 28 can be maintained to be the predetermined voltage (e.g. 3.6 V) of oscillator 16 which exceeds the allowable voltage range (i.e. 4.0 to 2.8 V) of drive voltage $V_D$ for the electronic components, voltage booster 29 may be omitted.

What is claimed is:

1. A displacement measuring apparatus comprising:

probe means brought into contact with an object to be measured;

oscillating means including a core member coupled to said probe means and a coil wound around said core member, said oscillating means outputting an oscillation frequency corresponding to a moving distance of said probe means when said core member is moved in said coil in response to a movement of said probe means;

counting means, coupled to said oscillating means, for counting the number of cycles of said oscillating means and for outputting a count signal representing the oscillation frequency;

arithmetic control means, coupled to said counting means, for computing the moving distance of said probe means based on a count from said counting means;

display means, coupled to said arithmetic control means, for displaying the moving distance computed by said arithmetic control means;

battery means for outputting a drive voltage;

voltage stabilizing means, coupled between said battery means and said oscillating means, for stabilizing the drive voltage output from said battery means, and for applying a predetermined stable voltage to said oscillating means; and means, coupled to said battery means and said counting means, arithmetic control means, and display means, for directly applying the drive voltage from said battery means to said counting means, said arithmetic control means, and said display means.

* * * * *